UNITED STATES PATENT OFFICE.

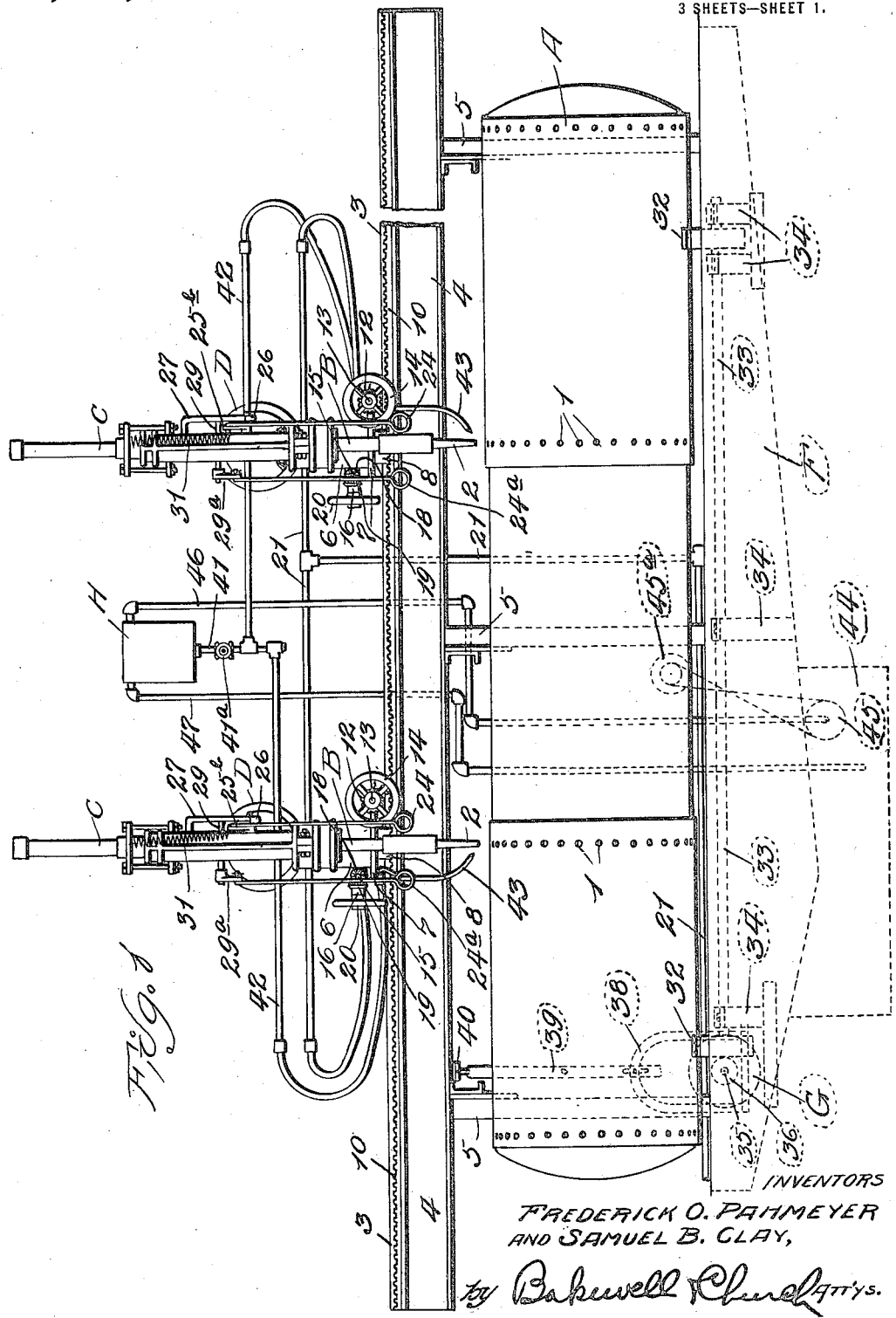

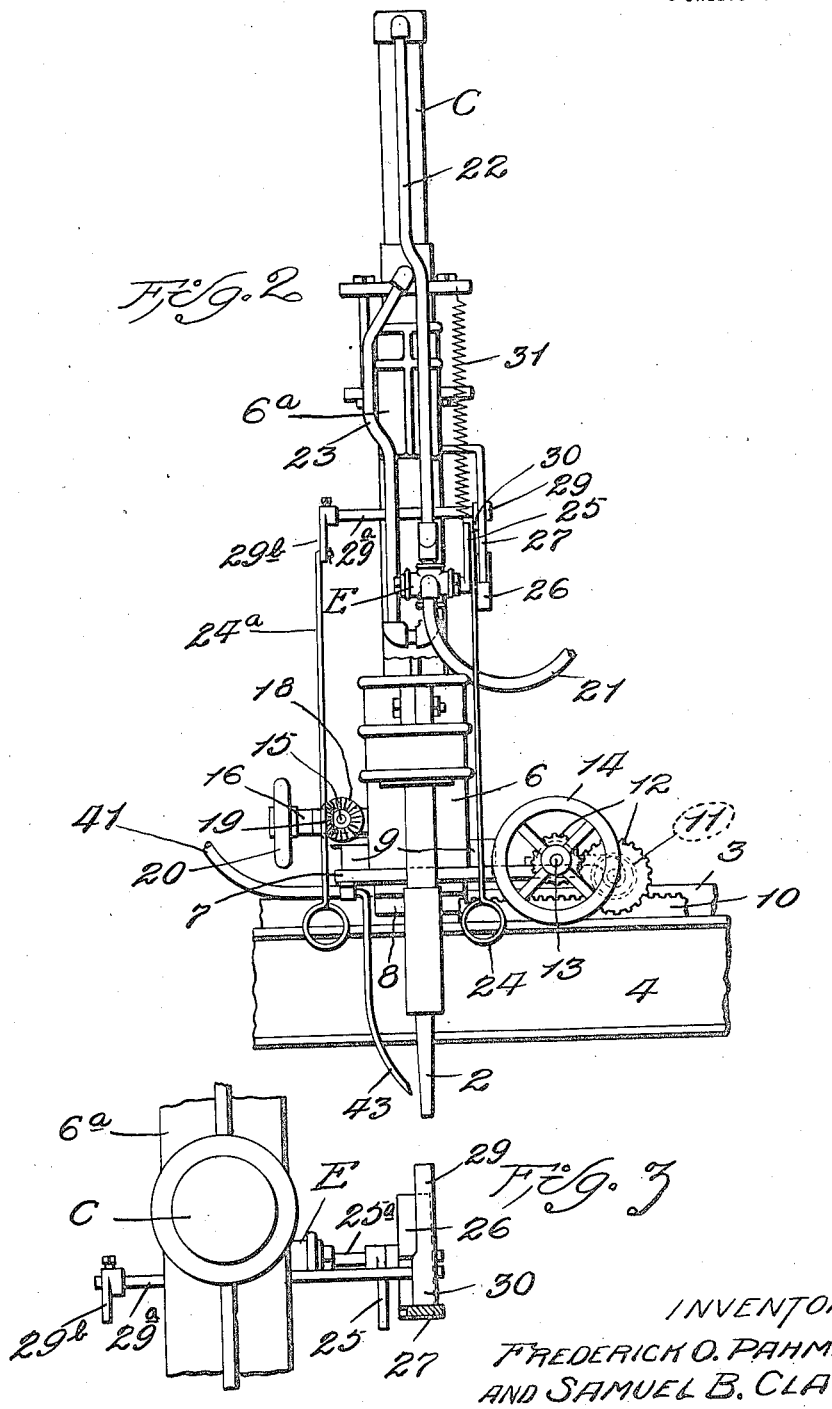

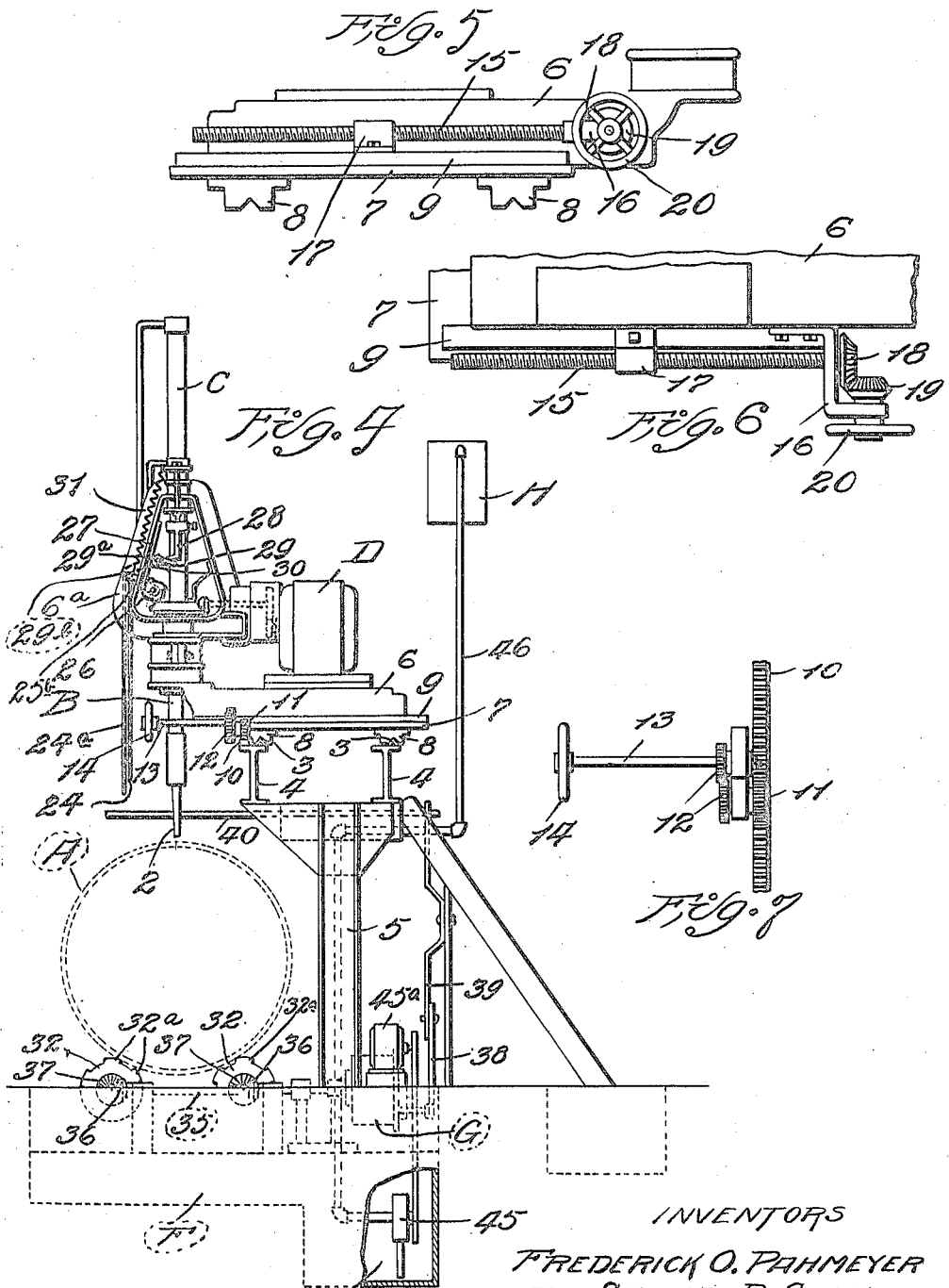

FREDERICK O. PAHMEYER AND SAMUEL B. CLAY, OF ST. LOUIS, MISSOURI, ASSIGNORS TO HEINE SAFETY BOILER COMPANY, OF ST. LOUIS, MISSOURI, A CORPORATION OF MISSOURI.

REAMING-MACHINE.

1,399,073.  Specification of Letters Patent.  Patented Dec. 6, 1921.

Application filed July 29, 1919. Serial No. 314,041.

*To all whom it may concern:*

Be it known that we, FREDERICK O. PAHMEYER and SAMUEL B. CLAY, citizens of the United States, residing in the city of St. Louis, State of Missouri, have invented a certain new and useful Improvement in Reaming-Machines, of which the following is a full, clear, and exact description, such as will enable others skilled in the art to which it appertains to make and use the same.

This invention relates to machines of the kind that are used for boring or reaming holes in metal objects.

The main object of our invention is to provide a machine that will materially reduce the time and labor of reaming holes in boiler shells, box headers and other parts of a boiler and also produce holes that are more perfect than holes produced by a reamer operated by a portable motor.

Another object is to provide a practicable boring or reaming machine capable of boring or reaming holes at various points on a large metal object and equipped with novel means for governing the operation and position of the reamer or cutting tool.

To this end we have devised a machine that comprises one or more drill spindles to which drills, reamers, or other cutting tools can be connected, means for rotating said spindles, a piston combined with each spindle and adapted to be operated by a liquid or by a fluid under pressure to force the cutting tool through the work, and means for enabling the position of the cutting tool with relation to the work to be accurately controlled.

We have herein illustrated our invention embodied in a machine for reaming holes in boiler shells and comprising two vertically-disposed drill spindles mounted on carriers that are adapted to be moved longitudinally of the shell, and means for enabling each drill spindle to be adjusted relatively to its carrier in a direction at right angles to the path of movement of the carrier, but we wish it to be understood that it is immaterial, so far as our invention is concerned, how many spindles the machine is provided with, whether the spindles are arranged vertically, horizontally or in an inclined position and whether the spindles are moved relatively to the work or the work moved relatively to the spindles to vary the position of the cutting tools with relation to the work. In the machine herein illustrated the shell being reamed is mounted on a work supporting means which is so constructed that one of the operators in charge of the machine can easily revolve or turn the shell, but various other means, either adjustable or stationary, can be used for supporting the work.

Figure 1 of the drawings is a front elevational view of a reaming machine constructed in accordance with our invention.

Fig. 2 is an enlarged front elevational view of one of the drill spindles and the parts associated with same for governing the position of the cutting tool and feeding said cutting tool through the work.

Fig. 3 is a top plan view of the air cylinder combined with the drill spindle and certain parts of the mechanism for governing the operation of the piston in said air cylinder, the locking pawl for the air valve being shown in section.

Fig. 4 is an end elevational view of the machine shown in Fig. 1.

Fig. 5 is a side elevational view of the mechanism employed for moving each of the drill spindles forwardly and rearwardly with relation to the carrier on which said spindle is mounted.

Fig. 6 is a top plan view of said mechanism; and

Fig. 7 is a top plan view of the mechanism employed for moving each of the drill spindle carriers longitudinally of the track on which said carrier is mounted.

In the accompanying drawings which illustrate one form of our invention, A designates the work to be operated on, consisting of a boiler shell provided with a plurality of rows of punched holes 1 and B designates two vertically-disposed drill spindles arranged above said boiler shell and each provided with a cutting tool consisting of a reamer 2. An overhead track is arranged above the boiler shell A and each of the drill spindles is mounted on a carrier that can be moved longitudinally of said track so as to arrange the reamer 2 on the spindle in alinement with one or the other rows of punched holes 1 in the boiler shell A. In the form of our invention herein illustrated the track on which the spindle carriers travel is formed by two rails 3, shown in Fig. 4, that extend longitudinally of the boiler shell A at a point above and at the rear of same and which are carried by a supporting structure formed by two I beams 4 carried by uprights 5. Each of the drill spindles B is mounted on a base plate 6, which, in turn, is adjustably mounted on a sliding carrier 7 provided on its underside with grooved members 8 that conform to the shape of the top sides of the rails 3, the spindle being mounted in a supporting structure 6ª on said base plate which is so designed that the spindle can revolve and also reciprocate vertically. The base plate 6 is slidingly mounted in guides 9 on the carrier 7, which guides are so arranged that the base plate 6 and the drill spindle supported by same can be moved forwardly and rearwardly, or, in other words, at right angles to the path of movement of the carrier 7 so as to arrange the reamer 2 in exact vertical alinement with the vertical longitudinal axis of the boiler shell A. Various means can be used for adjusting the drill spindle carriers 7 longitudinally of the track formed by the rails 3 and also for moving each of the base plates 6 forwardly and rearwardly with relation to the carrier on which it is supported, and while we have herein illustrated one form of means that we have found to be very efficient for varying the position of the drill spindles with relation to the work, it will be obvious that various other means could be employed for this purpose without departing from the spirit of our invention. The means used in the machine herein illustrated for moving each of the drill spindle carriers 7 longitudinally of its supporting track consists of a stationary rack 10 secured to the front I beam 4 of the track supporting structure, a pinion 11 meshing with said rack and journaled in a suitable bearing on the carrier 7 and a train of gears 12 for connecting said pinion with a horizontally-disposed operating shaft 13 provided at its front end with a hand wheel 14 that can be grasped easily by one of the operators standing in front of the boiler shell A, said mechanism being illustrated clearly in Figs. 4 and 7. The mechanism for moving the base plate 6 of each spindle carrier forwardly and rearwardly relatively to the carrier on which said base plate is mounted is illustrated in Figs. 5 and 6, and consists of a screw-threaded shaft 15 journaled in a stationary bearing 16 on the base plate and rotatably mounted in an internally screw-threaded hole formed in a block 17 that is rigidly connected to the carrier 7, said screw-threaded shaft 15 being provided at its front end with a beveled gear 18 which meshes with a beveled gear 19 secured to a shaft that is provided with a hand operating wheel 20, arranged in such a position that it can be gasped easily by an operator standing in front of the boiler shell A.

As previously stated, one feature of our invention consists in forcing the reamers or cutting tools through the work by means of hydraulic pressure or by means of air or some other fluid under pressure. Therefore, we have herein illustrated each of the drill spindles B provided with an air cylinder C whose piston is connected with the spindle in such a manner that when air or some other suitable operating medium is admitted to the cylinder C the drill spindle B to which the reamer 2 is connected will be forced downwardly, thereby feeding the reamer through the work. Various means can be used for rotating the drill spindles B, but we prefer to equip each drill spindle with an electric motor D mounted on the base plate 6 that carries the spindle and connected with the spindle by gears or in any other preferred manner so as to cause the spindle to revolve at a high rate of speed when the motor D is in operation. The spindles B of the machine normally occupy an elevated position, as shown in Fig. 1, and when the machine is in use said spindles rotate constantly. In using the machine the two operators in charge of the two drill spindles B first position said spindles so that the reamers 2 thereon will be in exact vertical alinement with two of the holes 1 at the longitudinal center of the boiler shell A, said spindles being positioned by manipulating the hand wheels 14 and 20 and by revolving the shell, as hereinafter described. Each of the operators then actuates a device which causes compressed air or some other suitable operating medium to be admitted to the cylinder C of the drill spindle which the operator controls. The operating medium that is admitted to the cylinder C forces the drill spindle B downwardly, and after the reamer has passed through the hole in the shell a tripping device operates automatically to cut off the supply of operating medium to the cylinder C and cause the piston in the cylinder and the spindle to which said piston is connected to move upwardly to its normal elevated position. It will be obvious that various means can be employed for governing the supply of the operating medium to the cylinders C so as to effect the feeding of the reamers through the work, but we prefer to equip each of the drill spindles with a controlling valve designated as an entirety in Fig. 2 by the reference character E and constructed in such a manner that when it is in its normal position pressure will be exerted on the underside of the piston in the cylinder C, thus holding the piston in its elevated position, and when said valve is moved by a means under control of the operator, the pressure of the operating medium will be exerted on the piston in a direction to move the piston downwardly.

As shown in Figs. 1 and 2, a supply pipe 13ª

21 leads to the casing of each of the valves E and two pipes 22 and 23 lead from each valve casing to the upper and lower ends of the cylinder C with which the valve coöperates. Normally, the valve E occupies such a position that the supply pipe 21 is in direct communication with the pipe 23 that leads to the lower end of the cylinder C, thus causing the pressure of the operating medium to be exerted upwardly on the underside of the piston in the cylinder, and consequently, maintaining the drill spindle in its elevated position. When it is desired to force the reamer through the work the operator moves the stem of the valve E in such a direction that the operating medium will exhaust from the lower end of the cylinder C and direct communication will be established between the supply pipe 21 and the pipe 22 that leads to the upper end of the cylinder, thereby causing the piston in the cylinder and the drill spindle connected to said piston to move downwardly. The valve E remains in this position, which we will refer to as its open position, while the piston is moving downwardly, and at a certain point in the downward stroke of the piston said valve is released automatically and restored to its former position, thereby causing the piston to move upwardly. The means herein illustrated for opening the valve E consists of a rod 24 secured to a lever 25 (see Figs. 3 and 4) that is connected to the stem 25ª of the valve E, said rod 24 being so arranged that it can be grasped easily by the workman in charge of the valve. A toothed wheel 26 shown in Figs. 2 and 4, is mounted on the outer end of the stem of said valve and a locking pawl consisting of a flat leaf spring 27 is provided for coöperating with said toothed wheel 26 to hold the valve in the position into which it was moved by pulling downwardly on the rod 24. Therefore, to open the valve E it is only necessary for the operator to pull downwardly on the rod 24, said valve remaining in its open position, due to the engagement of the locking pawl 27 with the toothed wheel 26 on the stem of the valve. At a certain point in the downward stroke of the piston in the cylinder C a stop 28 (shown in Fig. 4) that is connected to the drill spindle B engages an arm or extension 29 on a rock shaft 29ª provided with a cam 30 that bears against the locking pawl 27 and moves said rock shaft in such a direction that the cam 30 thereon disengages the locking pawl 27 from the toothed wheel 26 on the stem of the valve. Said valve will immediately move back to its former position or closed position under the influence of a coiled contractile spring 31 that is connected at its lower end to the arm 25 on the stem of the valve and at its upper end to a stationary part of the framework of the drill spindle. The stop 28 on the spindle can be adjusted so as to vary the time of tripping the locking pawl 27, and in order that the drill spindle may be stopped at any point in its downward movement, the rock shaft 29ª is provided with an arm 29ᵇ to which an emergency operating rod 24ª is connected, a downward pull on said emergency rod causing the cam 30 to trip the locking pawl 27, and thus permit the spring 31 to restore the valve to its normal position.

*Work support.*

The work supporting means previously referred to, on which the boiler shell A rests, preferably consists of a plurality of rotatable members 32 and mechanism under control of one of the operators in charge of the machine for revolving said members 32 so as to cause the shell A to turn and thus bring the punched holes 1 in same into such a position that the reamers 2 will be disposed radially with respect to the holes to be reamed. We have herein illustrated the rotatable work supporting members 32 connected to two horizontally-disposed shafts 33 arranged longitudinally of the boiler shell and journaled in bearings 34 located in a pit F, as shown in broken lines in Fig. 1, each of the shafts 33 being provided with two work supporting members 32 arranged adjacent the opposite ends of the shaft and equipped with teeth 32ª, as shown in Fig. 4, that bite into the boiler shell slightly and thus cause said shell to revolve about its longitudinal axis when the shafts 33 revolve. The mechanism for revolving the shafts 33 preferably consists of a reversible motor G whose drive shaft is connected to a shaft 35 provided with beveled gears 36 that mesh with beveled gears 37 on the shafts 33. Any suitable medium can be used for operating the motor G, such, for example, as electricity, a liquid or a fluid under pressure. In the form of our invention herein illustrated a reversible air motor G is used for operating the shafts 33 of the work supporting means and the controlling valve for said motor is provided with a yoke-shaped operating device 38, shown in broken lines in Fig. 1, that is pivotally connected to the lower end of a vertically-disposed lever 39 whose upper end is connected to an operating lever 40 arranged in such a manner that it can be grasped and actuated by one of the operators standing in front of the shell. A work supporting mechanism of the construction above described is of such simple design that it is not apt to get out of order and it makes it possible for one workman to revolve a boiler shell so as to bring the punched holes in same into alinement with the reamers by simply manipulating the lever 40 that governs the supply of the operating medium to the motor that turns the work supporting members 32.

The machine is provided with means for supplying soap water or some other suitable cooling liquid or cutting solution to the reamers 2, and while various means may be used for this purpose, we prefer to equip the machine with an elevated supply tank H provided with a discharge pipe 41 equipped with branches 42 that lead to nozzles 43 arranged in proximity to the reamers 2, as shown in Figs. 1 and 2, the discharge pipe 41 being provided with a controlling valve 41ª so as to enable the supply of the cooling liquid or cutting solution to the cutting tools to be accurately regulated. The liquid that is discharged from the nozzles 43 drains down over the boiler shell and collects in a sump 44 in the bottom of the pit F. Thereafter said liquid is pumped from the sump back to the supply tank H by any suitable means, such, for example, as a pump 45 operated by an electric motor 45ª, as shown in Fig. 4, the pump operating continuously when the machine is in use so that the liquid will be fed from the sump 44 through a supply pipe 46 to the tank H and the excess liquid conducted from said tank back to the sump through an overflow pipe 47.

Prior to our invention is was the usual practice to employ portable motors for reaming the punched holes in boiler shells, box headers and other parts of boilers, each motor being operated by two workmn. With our improved machine two workmen can ream the holes in a boiler shell in less time than is possible to ream the holes in a boiler shell with five portable motors and ten workmen, and moreover, the holes are perfectly round and are disposed radially with respect to the shell, a thing that is practically impossible to accomplish when portable motors are used, due to the fact that it is impossible for the workmen to hold the portable motors steady enough to prevent them from wabbling, and thus producing oval holes that are not disposed radially in the shell.

Having thus described our invention, what we claim as new and desire to secure by Letters Patent, is:

1. A boring or reaming machine, comprising a work support, a supporting structure extending longitudinally of said work support at one side of same, a longitudinally-movable carrier on said supporting structure, a reciprocating base plate on said carrier arranged to move in a direction at right angles to the direction of movement of said carrier, a spindle support on said base plate, a vertically-movable spindle in said support, an elevated cylinder on said spindle support arranged above the spindle and provided with a piston that raises and lowers said spindle, independent, manually-operable devices arranged at the front end of said spindle support for effecting the longitudinal movement of said carrier and for moving the base plate relatively to said carrier, and a valve operable from a point in proximity to said manually-operable devices for governing the admission of the medium used to operate the piston in said cylinder.

2. A machine for reaming boiler shells, comprising a boiler shell supporting means, a supporting structure arranged at the rear side of said means, a carrier on said supporting structure arranged to travel lnogitudinally thereof, a base plate on said carrier provided with a spindle that overhangs the boiler shell being operated on, an elevated cylinder provided with a piston that is directly connected to the upper end of said spindle, a valve for controlling the admission and exhaust of an operating medium to and from said cylinder, independent, manually-operable devices arranged in front of the boiler shell for effecting the longitudinal movement of said carrier, for shifting the base plate forwardly and rearwardly with relation to the boiler shell, for effecting a change in the position of the boiler shell and for opening said valve, means for locking said valve in its open position, means for releasing said valve when the spindle reaches a certain position, and a spring combined with said valve for automatically restoring it to its normal position so as to reverse the direction of movement of said spindle.

3. A boring or reaming machine, comprising a drill spindle provided with a cutting tool, means for rotating said spindle, a cylinder provided with a piston for reciprocating said spindle, a valve that is adapted to be moved manually in one direction to admit an operating medium to said cylinder so as to move the tool into engagement with the work, means for automatically locking said valve after it has been moved manually into the position just referred to, a tripping mechanism for said valve locking means, a device movable with the spindle that engages and actuates said tripping mechanism when the spindle approaches its limit of movement in one direction, and a spring combined with said valve in such a manner that it will move same and thus automatically reverse the direction of movement of the spindle.

4. A boring or reaming machine, comprising a rotatable spindle adapted to carry a cutting tool, a cylinder provided with a piston for reciprocating said spindle, a valve for governing the medium that operates said piston, a manually-operable means for opening said valve, a toothed member on the stem of the valve, a locking pawl that coöperates with said toothed member to hold said valve in its open position, a cam for tripping said locking pawl, a stop that moves with said spindle and causes said cam to operate when said spindle reaches a certain position, and a spring for restoring said valve to its former position so as to automatically reverse the direction of movement of said spindle.

5. A boring or reaming machine, comprising a rotatable spindle adapted to carry a cutting tool, a cylinder provided with a piston for reciprocating said spindle, a valve for governing the medium that operates said piston, a manually-operable means for opening said valve, a locking pawl that coöperates with a toothed member on the stem of said valve to hold it in its open position, a cam for tripping said locking pawl, a part that moves with said spindle for operating said cam, a spring for restoring said valve to its former position, and a manually-operable means for operating said cam so as to trip said locking pawl at the will of the operator in charge of the machine.

FRED. O. PAHMEYER.
SAMUEL B. CLAY.